July 7, 1936.   W. J. RADY ET AL   2,046,699
ELECTRICAL GENERATING SYSTEM
Filed Nov. 24, 1933
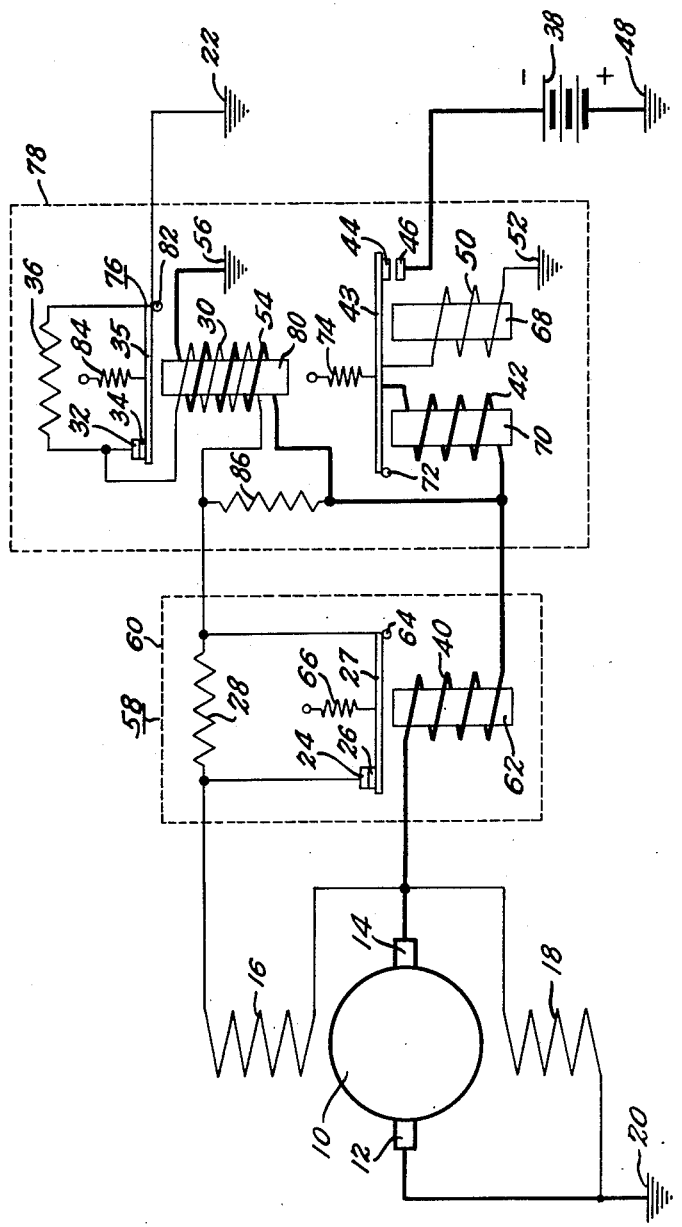
INVENTORS
William J. Rady
Herbert C. Porter
by Spencer Hardman and Fehr
their ATTORNEYS Patented July 7, 1936

2,046,699

UNITED STATES PATENT OFFICE 2,046,699

ELECTRICAL GENERATING SYSTEM

William J. Rady, Anderson, Ind., and Herbert C. Porter, Rochester, N. Y., assignors, by mesne assignments, to General Motors Corporation, Detroit, Mich., a corporation of Delaware Application November 24, 1933, Serial No. 699,526

6 Claims. (Cl. 171—229)

This invention relates to an electrical generating system and more particularly to one operating at variable speed, such as are used on automotive vehicles.

An object of this invention is to extend the range of and improve the control of the generator so that regulation will be provided over a relative wide range of speeds.

In the disclosed embodiment of this invention, the electrical generating system incorporates a plurality of cooperating control elements each of which supplements the action of the other. More specifically the invention in one of its aspects comprises a variable speed generator having a bucking shunt field winding as well as a main exciting winding and a controller responsive to a function of the output of the generator, such as voltage, said controller comprising a resistance connected in the circuit of the main exciting winding and an electromagnetic actuator for intermittently short circuiting the resistance, said regulator having an electromagnetic winding connected in series with the main exciting winding.

Another object of this invention is to provide an automatically controlled electrical generating and battery charging system, the electrical generator for which embodies exciting means so constructed and arranged that it supplements the automatic controlling means to provide effective regulation over a wider range of generator speed than could be conveniently and economically accomplished without such exciting means.

Further objects and advantages of the present invention will be apparent from the following description, reference being had to the accompanying drawing wherein a preferred embodiment of the present invention is clearly shown.

In the drawing:

The single figure of the drawing is a diagrammatic representation of a preferred embodiment of the present invention.

As illustrated in the drawing, a dynamo electric machine or generator 10, has brushes 12 and 14, a main exciting winding 16 and an auxiliary or bucking field winding 18. The brush 12 is connected to ground at 20. The auxiliary or bucking field winding 18 has one of its ends connected to the brush 14 and its other end connected to ground at 20; hence, this auxiliary or bucking winding is a shunt field winding. One end of the main exciting winding 16 is also connected to the brush 14, while the other end of that winding is connected to ground at 22, through a circuit comprising normally closed contacts 24 and 26 and contact carrying arm 27, or a resistance 28; an electromagnet winding 30; and normally closed contacts 32 and 34 and a contact carrying arm 35, or a resistance 36. Hence, this main exciting winding 16 is also in reality a shunt field winding. The generator is thus self-exciting, and the main exciting winding 16, preferably has a greater number of ampere turns than does the auxiliary or bucking field winding 18, so that main exciting force is provided by the main exciting winding 16.

The generator 10 supplies current for a load such as a battery 38 that is to be charged, and the load current supply circuit includes the connection of the brush 12 to ground at 20; a circuit including an electromagnet winding 40, an electromagnet winding 42, contact carrying arm 43, normally open contacts 44 and 46; and the connection of one side of the battery 38 to ground at 48. Besides the load that is connected to the generator through the electromagnet windings 40 and 42, an electromagnet winding 50 is connected across the generator brushes through the electromagnet windings 40 and 42 by virtue of its connection to the contact carrying arm 43 and to ground at 52. An electromagnet winding 54 is connected across the generator brushes through the electromagnet winding 40 by virtue of its connection to the winding 40 intermediate that winding and the winding 42, and its connection to ground at 56. The electromagnet windings 50 and 54 are consequently responsive to generator voltage although the voltage across those windings is somewhat lower but always proportional to the generator voltage because of the voltage drop due to the resistances of the windings 40 and 42.

Current regulation or control of the generator output is accomplished by a current regulator 58 which includes the normally closed contacts 24 and 26, contact carrying arm 27 and electromagnet winding 40. This regulator is preferably enclosed in a container indicated by the dotted lines as at 60. The electromagnet winding 40 is wound on a core, of magnetic material, 62, a portion of which core is near the contact carrying arm 27 and magnetically associated therewith. The contact carrying arm 27 may be made of resilient material and normally biased away from the electromagnet core 62 so that the contacts 24 and 26 are normally urged into engagement; but as indicated, the arm is pivoted as at 64 and a spring or resilient member 66 urges the arm away from the core 62 and to a position such that the contacts 24 and 26 are normally engaged. The contact 26 is mounted on the contact carrying arm 27 and electrically connected thereto, while the cooperating contact 24 is stationary. When these contacts are closed, they short circuit the resistance 28 that is connected in series with the main exciting winding 16.

The electromagnet winding 50 is wound on a core 68 of magnetic material, a portion of which core is near the contact carrying arm 43 and magnetically associated therewith. The electromagnet winding 42 is wound on a core 70 that is also near to and magnetically associated with the contact carrying arm 43, and on the same side thereof as the core 68. The contact carrying arm 43 may be made of resilient material normally biased away from the cores 68 and 70 so that the contacts 44 and 46 are normally disengaged; however, as shown, the arm 43 is pivoted as at 72 and is urged or biased away from the cores 68 and 70 by a spring or resilient member 74. The contact 44 is mounted on the contact carrying arm 43 and is electrically connected thereto, while the cooperating contact 46 is stationary. This latter assembly comprises a cut-out relay that protects the battery from being discharged through the generator when the generator output is too low to supply current to the battery.

Voltage regulation or control of the generator output is effected by a voltage regulator 76 that is conveniently and preferably included in a housing or container with the cut-out relay as indicated by the dotted lines 78. In the voltage regulator, the electromagnet windings 30 and 54 are preferably wound on a single core 80 of magnetic material, which core is near and in magnetic relation with the contact carrying arm 35. The contact carrying arm 35 may also be made of resilient material and biased away from the core 80 so that the contacts 32 and 34 are normally engaged. As shown, the arm 35 is pivoted as at 82 and is normally urged away from the core 80 by a spring or resilient member 84, so that the contacts 34 and 32 are normally urged into engagement to short circuit the resistance 36, which resistance is also connected in series with the main exciting winding 16. A resistance 86 is connected to the end of the electromagnet winding 30 that is connected to the resistance 28, and is also connected to the end of the electromagnet winding 54 that is connected to the electromagnet winding 40.

In the operation of this system, the generator is driven by any suitable driving means such as an automobile engine. When the speed of the generator reaches a value such that the output voltage is sufficient, the voltage applied to the electromagnet winding 50 is sufficient to attract the arm 43 and move that arm against the biasing force of the spring 74 to effect engagement of the contacts 44 and 46 and close the load circuit so that voltage is applied to the load by the generator. When the contacts 44 and 46 are closed, the load current flowing from the generator to the load flows through the electromagnet winding 42 to hold or lock the arm 43 in the contact closed position so that variations in the generator voltage will not permit the release of the arm 43 and disengagement of the contacts 44 and 46 unless the load current drops below a predetermined value.

The constants of the current regulator, such as the normal ampere turns of the electromagnet 40 and the normal tension of the spring 66, and also the value of the resistance 28 are preferably chosen so that under normal operating conditions of the system, the arm 27 vibrates and thus intermittently or periodically short circuits the resistance 28. That is, when the magnetomotive force of the electromagnet winding 40 becomes sufficient it attracts the arm 27 to disengage the contacts 24 and 26. This disengagement of the contacts 24 and 26 opens the short circuit across the resistance 28 to effect a reduction in the main exciting winding current. This reduction in the main exciting winding current sufficiently decreases the generator output current to reduce the magnetomotive force of the winding 40 to a value that permits the spring 66 to return the arm 27 to its normal position and effect engagement of the contacts 24 and 26. When the contacts are thus reengaged, the field current through the main exciting winding 16 is again increased. This operation preferably occurs and reoccurs in rapid succession under normal operating conditions, and the speed or rate at which the said operations reoccur is dependent upon the current output of the generator current output or load current. Thus, the current regulator tends to regulate or control generator and load current so as to compensate for variations in generator speed. This regulator thus tends to maintain the generator current at a constant value regardless of variations, within reasonable limits, of the generator speed.

Since the electromagnet winding 54 is connected across the generator brushes, as previously described, and is therefore responsive to generator voltage, the regulator 76 tends to regulate or control the generator voltage and to maintain that voltage at a constant value regardless of the variations in the speed of the generator, within reasonable limits. When the voltage of the generator reaches a value that is sufficiently high, the arm 35 is moved toward the core 80 against the urging force of the spring 84 to disengage the contacts 32 and 34 and thus open the short circuit across the resistance 36. Since the resistance 36 is also in series with the main exciting winding 16, and is connected in series with the electromagnet winding 30, the opening of the contacts 32 and 34 effects a reduction in the main exciting winding current as well as in the current to the electromagnet winding 30. The reduction in generator voltage effected by this reduction in the main exciting winding current as well as the reduction in the current flow through the electromagnet winding 30 sufficiently weakens the magnetomotive force of the windings 30 and 54 to permit the spring 84 to return the arm 35 to its normal position and reengage the contacts 32 and 34. These operations also preferably occur in comparatively rapid succession to intermittently or periodically short circuit the resistance 36, and the rapidity with which the operations reoccur is dependent upon the generator voltage. The resistance 86, that is connected to the electromagnet windings 30 and 54, effects a current flow through the electromagnet winding 30 that is greater than the current flow through the main exciting winding 16 so that the variations in the magnetomotive force of the electromagnet winding 30 are increased and are more conducive to the vibratory action of the regulator. This resistance 86 also increases the current flow through the resistance 36 to increase the voltage drop thereacross.

It may be noted that both the current and voltage regulators control resistances that are connected in series with the main exciting winding. Hence, the auxiliary or bucking field winding 18 is virtually independent of the current and voltage regulators. The function of this bucking field winding 18 is to widen or extend the range of effective generator regulation, and particularly to assist the regulators in accomplishing the regulation at the higher generator speeds. That is, when the speed of the generator is increased beyond some predetermined value for each regulator, the effectiveness of that regulator in accomplishing its control becomes less with further increase of generator speed. Under such conditions, an example of an extreme condition might be considered as one in which the current regulator is held open continuously by the magnetic force of the electromagnet. As the generator speed and voltage increase, the current through the bucking exciting increases to aid in the reduction of the generator voltage and current at the higher speeds. This action assists those of the regulators. Since the bucking field winding preferably has less ampere turns than does the main exciting winding, the bucking field has relatively little effect at the lower generator speed.

From the foregoing description of the construction and mode of operation of the present generating system, it will be apparent that the system comprises chiefly a variable speed generator having a main exciting winding 16 and a bucking shunt field winding 18, which generator supplies current to a load, such as a battery 38, in combination with a voltage controlling means which comprises a resistance 36 connected in the circuit in the main exciting winding 16 and an electromagnetically actuated regulator having a core 80, windings 54 and 30, armature 35 and contacts 32 and 34 for intermittently short circuiting the resistance 36, said regulator having an electromagnetic winding 30 connected in series with the main exciting winding 16. The system also includes a current controlling means which comprises a resistance 28 connected in the circuit of the main exciting winding 16 and an electromagnetically actuated regulator having a core 62, winding 40, armature 27 and contacts 24 and 26 for intermittently short circuiting the resistance 28; said electromagnet winding 40 being connected in series with one of the output leads of the generator.

This combination of elements and circuits possesses the following advantages:

1. The regulating means cooperate to provide a wider satisfactory range of regulation.
2. Smooth or even regulator characteristics are provided.

While the embodiment of the present invention as herein disclosed, constitutes a preferred form, it is to be understood that other forms might be adopted, all coming within the scope of the claims which follow.

What is claimed is as follows:

1. An electrical generating system comprising, in combination, a generator having a self excited main exciting winding and an auxiliary bucking shunt field winding, a load having voltage applied thereto from the generator, and means for controlling the voltage of the generator, said means comprising a resistance in the circuit of the main exciting winding, and an electromagnetically actuated regulator for intermittently short circuiting said resistance, said regulator having an electromagnet winding connected in series with one of the said windings of the generator.

2. An electrical generating system comprising, in combination, a variable speed generator having a main exciting winding and a bucking shunt exciting winding, a load having voltage applied thereto from the generator, and means for controlling the voltage of the generator, said means comprising a resistance connected in the circuit of the main exciting winding, and an electromagnetically actuated regulator for intermittently short circuiting said resistance, said regulator having an electromagnet winding connected in series with the main exciting winding.

3. An electrical generating system comprising, in combination, a variable speed generator having a main shunt exciting winding and a bucking exciting winding permanently connected across the generator, a load having voltage applied thereto from the generator, and means for controlling the voltage of the generator, said means comprising a resistance connected in the circuit of the main shunt exciting winding, and an electromagnetically actuated regulator for intermittently short circuiting said resistance, said regulator having an electromagnet winding connected in series with one of the said windings of the generator.

4. An electrical generating system comprising, in combination, a variable speed generator having a main exciting winding and a bucking shunt exciting winding permanently connected across the generator, a load having voltage applied thereto from the generator, means for controlling the current output of the generator, and means for controlling the voltage of the generator, said means for controlling the voltage comprising a resistance connected in series with the main exciting winding, and an electromagnetically actuated vibratory regulator for intermittently short circuiting the resistance, said regulator including an electromagnet having a plurality of magnetically aiding windings thereon, one of the electromagnet windings having a voltage applied thereto that is proportional to the generator voltage, and the other of the electromagnet windings having a current flow therethrough that is partially controlled by the current flow through one of the said windings of the generator.

5. An electrical generating system comprising, in combination, a variable speed generator having a main exciting winding and a bucking shunt exciting winding, a load having voltage applied thereto from the generator, a vibratory regulator responsive to load current for controlling the generator output, and means for controlling the voltage of the generator, said means for controlling the voltage comprising a resistance connected in series with the main exciting winding, and an electromagnetically actuated regulator for intermittently short circuiting the resistance, said regulator including an electromagnet having a pair of windings thereon, one of the electromagnet windings having a voltage applied thereto that is proportional to the generator voltage, and means whereby the other of the electromagnet windings has a current flow therethrough that is related to but greater than the current flow through the main exciting winding.

6. An electrical generating system comprising, in combination, a variable speed generator having a main exciting winding and bucking shunt exciting winding, a load having voltage applied thereto from the generator, means for controlling the current output of the generator, and means for controlling the voltage of the generator, said means for controlling the current comprising a resistance connected in series with the main exciting winding, and a regulator for intermittently short circuiting said resistance, said means for controlling the voltage comprising a second resistance also connected in series with the main exciting winding and an electromagnetically actuated regulator for intermittently short circuiting said second resistance, said electromagnetically actuated regulator including an electromagnet having a plurality of windings thereon, one of said electromagnet windings having a voltage applied thereto that is proportional to the generator voltage, and the other of the electromagnet windings having a current flow therethrough that is partially, and only partially, dependent upon the current flow through the main exciting winding.

WILLIAM J. RADY.
HERBERT C. PORTER.